US009825897B2

(12) United States Patent
Sloan et al.

(10) Patent No.: US 9,825,897 B2
(45) Date of Patent: Nov. 21, 2017

(54) GENERAL PURPOSE MESSAGING

(71) Applicant: Visa International Service Association, San Francisco, CA (US)

(72) Inventors: Dinah Sloan, San Jose, CA (US); Erick Wong, Menlo Park, CA (US); Michael Middlemas, San Francisco, CA (US); Christian Aabye, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 285 days.

(21) Appl. No.: 14/714,071

(22) Filed: May 15, 2015

(65) Prior Publication Data

US 2015/0249634 A1 Sep. 3, 2015

Related U.S. Application Data

(63) Continuation of application No. 13/051,815, filed on Mar. 18, 2011, now Pat. No. 9,111,280.

(60) Provisional application No. 61/325,142, filed on Apr. 16, 2010.

(51) Int. Cl.
*G06Q 10/10* (2012.01)
*H04L 12/58* (2006.01)
*G06Q 30/00* (2012.01)
*H04L 29/08* (2006.01)

(52) U.S. Cl.
CPC .......... *H04L 51/26* (2013.01); *G06Q 10/107* (2013.01); *G06Q 30/00* (2013.01); *H04L 67/10* (2013.01); *H04L 51/00* (2013.01)

(58) Field of Classification Search
CPC ................................ G06Q 10/107; H04L 12/58
USPC ............................................................. 709/207
See application file for complete search history.

(56) References Cited

U.S. PATENT DOCUMENTS

| | | |
|---|---|---|
| 5,867,688 A | 2/1999 | Simmon et al. |
| 6,505,032 B1 | 1/2003 | McCorkle et al. |
| 6,644,546 B2 | 11/2003 | George et al. |
| 6,668,284 B1 | 12/2003 | Parkhurst |
| 6,874,018 B2 | 3/2005 | Wu |
| 8,266,205 B2 | 9/2012 | Hammad et al. |
| 2002/0059388 A1* | 5/2002 | Thompson ............ H04L 1/1642 709/206 |
| 2002/0087649 A1 | 7/2002 | Horvitz |

(Continued)

OTHER PUBLICATIONS

Non-Final Office Action dated Oct. 9, 2012 for U.S. Appl. No. 13/051,815, 11 pages.

(Continued)

*Primary Examiner* — Suraj Joshi
(74) *Attorney, Agent, or Firm* — Kilpatrick Townsend & Stockton LLP

(57) ABSTRACT

Embodiments of the present invention relate to systems and methods for enabling entities, such as issuers, merchants, payment processing networks, and mobile-network operators, to send account-related messages and marketing messages to a user's mobile device in response to a message request sent from the user's mobile device. According to some embodiments, the account-related messages and the marketing messages are sent to the user's mobile device in accordance with message parameters that are defined by the user and that are embedded in the message request.

17 Claims, 8 Drawing Sheets

(56) References Cited

U.S. PATENT DOCUMENTS

| | | |
|---|---|---|
| 2006/0036695 A1 | 2/2006 | Rolnik |
| 2006/0122921 A1 | 6/2006 | Comerford et al. |
| 2007/0105536 A1 | 5/2007 | Tingo |
| 2007/0118608 A1* | 5/2007 | Egli .................... G06F 17/3089 709/217 |
| 2008/0167961 A1 | 7/2008 | Wentker |
| 2008/0183480 A1 | 7/2008 | Carlson |
| 2008/0256257 A1 | 10/2008 | Miller et al. |
| 2009/0150218 A1 | 6/2009 | Brunner |
| 2009/0298481 A1 | 12/2009 | Hurst |
| 2010/0075638 A1 | 3/2010 | Carlson et al. |
| 2010/0122274 A1 | 5/2010 | Gillies et al. |
| 2011/0258280 A1 | 10/2011 | Sloan et al. |

OTHER PUBLICATIONS

Final Office Action dated May 9, 2013 for U.S. Appl. No. 13/051,815, 13 pages.
Non-Final Office Action dated Jun. 19, 2014 for U.S. Appl. No. 13/051,815, 14 pages.
Notice of Allowance dated Feb. 20, 2015 for U.S. Appl. No. 13/051,815, 10 pages.
International Search Report and Written Opinion dated Dec. 26, 2011 in International Application No. PCT/US2011/032908, 10 pages.
International Report on Patentability dated Oct. 26, 2012 in PCT/US2011/032908, 5 pages.

\* cited by examiner

GENERAL PURPOSE MESSAGING

CROSS-REFERENCES TO RELATED APPLICATIONS

This application is a continuation application of and claims the benefit of priority of U.S. patent application Ser. No. 13/051,815, entitled, "GENERAL PURPOSE MESSAGING," filed Mar. 18, 2011, and U.S. Provisional Patent Application No. 61/325,142, entitled, "GENERAL PURPOSE MESSAGING," filed Apr. 16, 2010, which are herein incorporated by references in their entirety for all purposes.

BACKGROUND

There are many occasions where a user may want to receive messages from merchants, banks, and other such entities. For example, a user may want to be notified when his or her checking account drops below a threshold amount or when his or her credit-card account is approaching its credit limit. Also, for example, a user may want to receive promotional offers, coupons, communications regarding affinity programs, and other marketing messages from certain merchants.

These types of messages may be sent to the user's mobile phone. However, such messages may be sent to the user's mobile phone at any time, in no particular order, and without regard to the type and/or priority of the messages. Accordingly, the messages may potentially clutter the user's mobile phone with messages the user may not be interested in receiving at that time. For example, on any given day, the user may receive dozens of marketing messages but only one or two important account-related messages. In this case, there is some risk the user may overlook the one or two important account-related messages because those important messages may be buried among dozens of marketing messages.

Further, because these messages may be sent to the user without regard to time, the messages may be sent at times when the user may not be receptive to receiving such messages. For example, if marketing messages are sent midday when the user is busy working, the user may be less likely to review the contents of the message. What's more, because the security of the channels through which these messages are sent may not be sufficiently robust, the content of account-related messages may have to be generalized so as to not include important details. In this case, upon receiving an account-related message, a user may have to take further action, such as accessing his or her online banking account, to obtain further details. Also, to the extent sensitive information is included in these messages, there may be a risk of unintended third parties obtaining access to the information.

It would be desirable to improve upon existing messaging systems to make the content and delivery parameters of messages more customized to individual users' preferences as well as to make transmission of such messages more secure.

Embodiments of the invention address these and other problems, individually and collectively.

BRIEF SUMMARY

Embodiments of the invention relate to systems and methods for enabling entities, such as issuers, merchants, payment processing networks, and mobile-network operators, to send account-related messages and marketing messages to a user's mobile device.

One embodiment of the invention is directed to a system that comprises a message-sending entity (e.g., an issuer or merchant), a mobile device associated with a user, and a message service having a gateway provided in communication with the mobile device. In some embodiments, the message-sending entity sends messages to the message service, and the mobile device selectively "pulls" messages from the message service. In other embodiments, the message-sending entity "pushes" messages to the mobile device via the message service.

According to an embodiment, to pull messages, the mobile device constructs and sends a message request to the message service. The message request, which may be generated by a mobile application running on the mobile device, includes message parameters embedded therein. For example, the user may access the mobile application to select message parameters that specify priority levels of messages that the user wishes to receive, the order in which the user wishes to receive the messages, and the maximum number of messages that the user wishes to receive in response the message request.

After the user selects the message parameters, the mobile application embeds the message parameters into the message request and sends the message request to the message service. For example, the mobile application may embed the message parameters in the form of data elements. Upon receiving the message request having the message parameters embedded therein, the message service locates messages that are pending delivery to the user, identifies which of the pending messages satisfy the message parameters, and sends the identified pending messages according to the message parameters. According to an embodiment, the messages that are located in the message service and that are pending delivery to the user originate from the message-sending entities, which provided the messages to the message server with instruction to forward the messages to users. According to another embodiment, the message service may generate messages on behalf of message-sending entities, thereby alleviating message-sending entities from the task of actually generating messages and sending those messages to the message service for later delivery to users.

According to an embodiment, to push messages, the message-sending entity sends to the message service a message that the entity intends to push to the user. Additionally, the message-sending entity instructs the message server to send a "wake up" message to the mobile device of the user. According to an embodiment, the message-sending entity sends the "wake up" message directed to the mobile device of the user. The "wake up" message instructs the mobile application running on the mobile device to pull the message from the message service by sending a message request to the message service. According to an embodiment, to ensure the mobile device pulls the appropriate message, the message-sending entity tags the message as an urgent message and configures the "wake up" message to instruct the mobile application to construct a message request that pulls urgent messages. According to some embodiments, instead of the message-sending entity constructing and sending the push message to the message service, the message service generates the push message on behalf of the message-sending entity.

According to an embodiment, the mobile device comprises a secure element for securely holding the mobile application that runs on the mobile device. The secure element provides the ability to securely store user-specific personal information, such as messages received from the messaging server. Thus, the content of account-related messages sent from the message server may securely include important and sensitive details about the user's financial account.

Other embodiments of the invention are directed to computer-readable media comprising code for performing the above-described methods as well as systems, apparatuses and devices that perform the methods and/or that use the computer-readable media.

These and other embodiments are described in further detail below.

DETAILED DESCRIPTION

Figure 1:
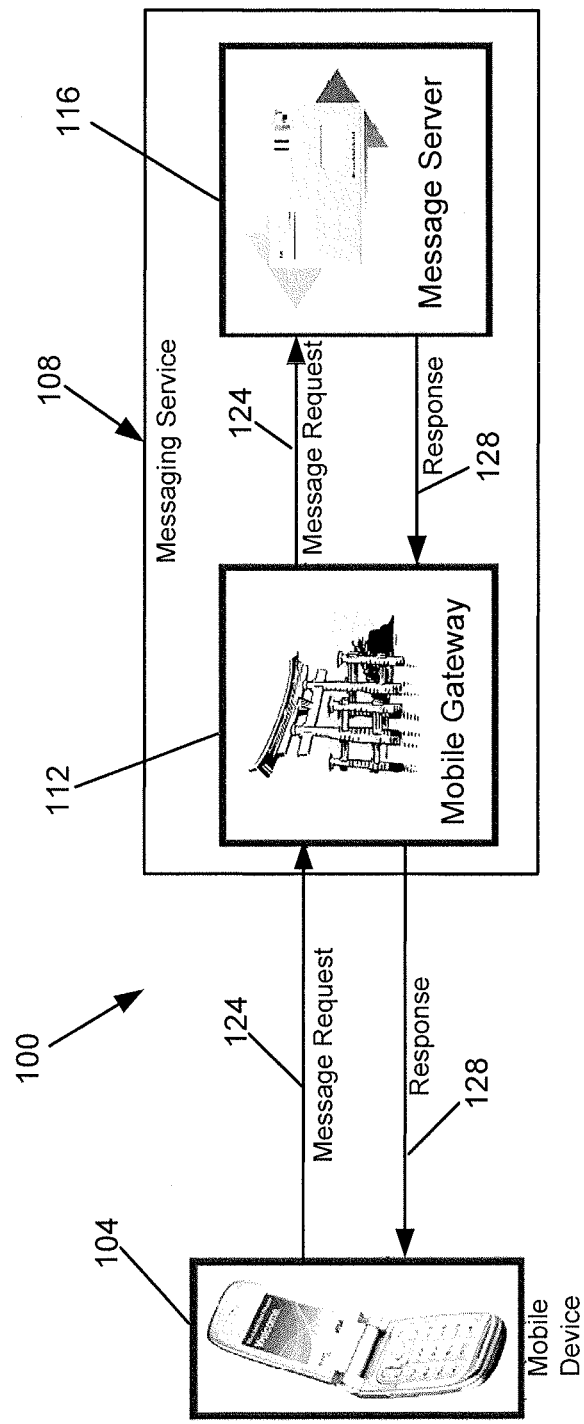
FIG. 1 shows aspects of a messaging system, according to an embodiment of the invention.

Embodiments of the present invention relate to systems and methods for enabling entities, such as issuers, merchants, payment processing networks, and mobile-network operators, to send account-related messages, marketing messages, and other types of messages to a user's mobile device. According to some embodiments, the messages are sent to the user's mobile device in accordance with message parameters, which are defined by the user and which are embedded in message requests sent from the user's mobile device. For example, according to an embodiment, the embedded user-defined parameters may specify whether and when pending messages having particular priority designations may be delivered to the user's device, the maximum number of pending messages that may be delivered to the user's device at any given time, and which priority designations may be delivered to the user's device in response to a particular message request sent from the user's device. Further, some embodiments of the present invention relate to a secure element for securely holding a mobile application that runs on the user's mobile device. This secure element provides the ability to securely store on the mobile device user-specific personal information, such as account-related messages.

Embodiments of the invention are implemented in a system that comprises a message-sending entity (e.g., an issuer or merchant), a mobile device associated with a user, and a message service having a gateway provided in communication with the mobile device. In some embodiments, the message-sending entity sends messages to the message service, and the mobile device selectively "pulls" messages from the message service. In other embodiments, the message-sending entity "pushes" messages to the mobile device via the message service.

According to an embodiment, to pull messages, the mobile device sends a message request to the message service. The message request, which, for example, may be generated by a mobile application running on the mobile device, includes message parameters. The message parameters may be embedded as data elements in the message request. Further, for example, the message parameters may specify that the message service may send response messages to the user's mobile device if the response messages are: urgent; urgent or high priority; or urgent, high priority, or regular priority. Further, for example, the message parameters may specify a maximum number of response messages that the message service may send to the user's mobile device in response to the message request and the order in which the message service may send the response messages. For example, the message parameters may specify that urgent messages are to be sent first and then, if all urgent messages have been sent and the maximum-count number permits, high-priority messages may be sent. Continuing with this example, the message parameters may further specify that if all high-priority messages have been sent and the maximum-count number permits, then regular-priory messages may be sent.

After receiving the message request and the message parameters included therein, the message service, according to an embodiment, locates messages that are pending delivery to the user. The pending messages may be account-related or marketing messages from message-sending entities, such as issuers, merchants, payment processing networks, mobile-network operators, etc. The message service then sends the pending messages to the user's mobile device in accordance with the message parameters.

According to an embodiment, to push messages, the message service receives a message intended for the user from a message-sending entity along with a request to push the message to the mobile device of the user. Upon receiving the message and the request to push the message, the message service sends a "wake up" message to the user's mobile device. According to an embodiment, instead of the message service sending the "wake up" message, the message-sending entity sends the "wake up" message to the user's mobile device. Upon receiving the "wake up" message, the mobile application running on the mobile device builds a message request and sends the message request to the message service. Upon receiving the message request, the message service sends the message to the user's mobile device. Thus, by sending the "wake up" message to the mobile device, the message service is able to send the message to the mobile device soon after receiving it from the message-sending entity.

According to an embodiment, upon receiving a message and a request to push the message to a user's mobile device, the message service tags the message as an urgent message and includes in the "wake up" message an instruction that causes the mobile application running on the user's mobile device to build a message request, which requests urgent messages and may also request other priority messages. According to this embodiment, the message server, upon receiving the message request from the user's mobile device, locates urgent messages that are pending delivery to the user and then sends the messages in a response message to the user's mobile device.

According to an embodiment, each response message sent from the message service to the mobile device includes a sequence value. For example, the first message sent from the message service to the mobile device may include a sequence value of 1, the second message may include a sequence value of 2, and the third message may include a sequence value of 3. The mobile device, when building a message request, may include in the message request the sequence value of the last response message that the mobile device received from the message service. For example, if the last response message received by the mobile device included the sequence value of 2, then the mobile device includes the sequence value of 2 in its message request to the message service. Thus, upon receiving the message request from the mobile device, the message service may compare the sequence value that the mobile device included in the message request to the sequence value of the last response message that the message service sent to the mobile device. This comparison enables the message service to determine whether the mobile device received the last response message sent from the message service to the mobile device.

If, in its last message request, the mobile device included a sequence value that is less than the sequence value the message service included in the last response message that it sent to the mobile device, then the message server determines that its last response message was not received by the mobile device and resends the messages that were contained in the last response message. For example, if the message request includes the sequence value of 2 but the last response message sent to the mobile device included the sequence value of 3, then the message service determines that the mobile device did not receive the last response message that had the sequence value of 3. Accordingly, the message service may resend the messages that were contained in the last response message.

Among other benefits, embodiments of the present invention provide systems and methods that enable efficient delivery of messages to users, where the messages are sent in accordance with the users' preferences. For example, before sending a message to a user, known systems and methods locate and access the user's profile, which may be stored on a remote database, to obtain the user's message preferences. After obtaining the user's message preferences, known systems and methods send the message to the user in accordance with the user's preferences. Further, according to known systems and methods, before receiving messages, the user may have to access the remote database to setup or update his or her user profile with his or her message preferences.

In contrast, embodiments of the present invention enable the user to access a mobile application running on the user's mobile device to select message parameters and to send message requests to a message service, where the message parameters are included in the message requests. The message parameters instruct the message service regarding how to reply with one or more response messages. Accordingly, the message service is able to reply without having to first access a remote database, locate the user's profile, and obtain the user's message preferences. Further, users can select message parameters for individual message requests using the mobile application running on their mobile device. This is advantageous over inefficient prior-art systems, which require that users access their profile on a remote database to input or update their message preferences.

Other specific examples of embodiments of the invention are described in further detail below.

FIG. 1 is a diagram illustrating a messaging system 100, in accordance with an embodiment of the invention. The messaging system 100 includes a mobile device 104 and a messaging service 108, which includes a gateway 112 and a message server 116. Although the gateway 112 is illustrated as being a part of the messaging service 108, it should be appreciated that the mobile gateway 112 may be separate from the messaging service 108.

Figure 2:
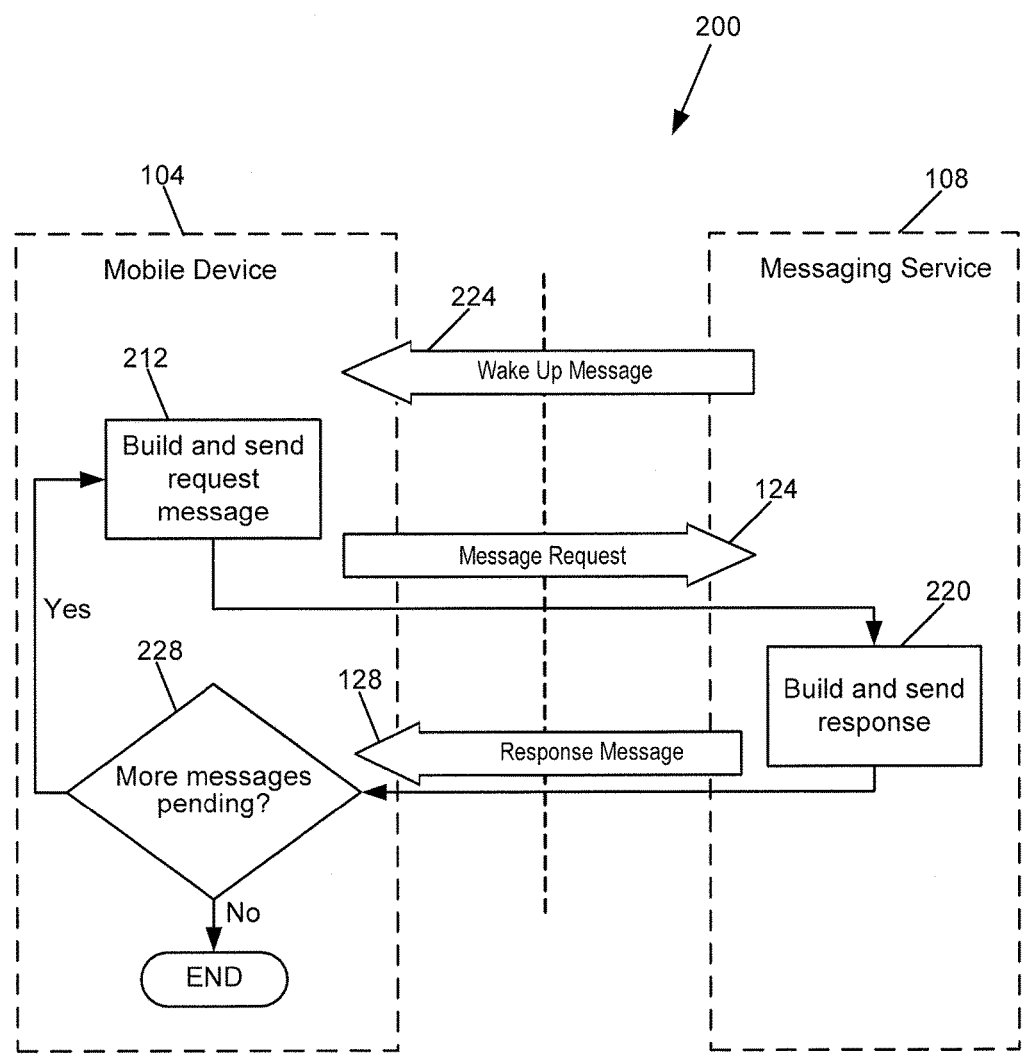
FIG. 2 is a flowchart illustrating example steps involved in sending and receiving message requests and response messages, according to an embodiment of the invention.

FIG. 2 shows a flowchart illustrating an example process 200 for using the messaging system 100 to send messages from the message service 108 to the mobile device 104, according to an embodiment of the invention. As represented at block 212, the process 200 generally begins with the mobile device 104 building a message request 124 and sending the message request 124 to the messaging service 108. According to an embodiment, the messaging service 108 may send a "wake up" message 224 to the mobile device 104 and thereby prompt the mobile device 104 to build and send the message request 124. When building the message request 124, according to an embodiment, the mobile device 104 includes user-defined message parameters in the message request 124. The message parameters, for example, are embedded in the message request 124 in the form of data elements and specify priority levels of messages that a user of the mobile device 104 wishes to receive in response to the message request 124.

For example, the embedded message parameters may specify that response messages may be sent if the response messages are: urgent; urgent or high priority; or urgent, high priority, or regular priority. Further, the message parameters may specify the order in which the response messages may be sent. For example, the message parameters may specify that urgent messages are to be sent first and then, if all urgent messages have been sent and the maximum-count number permits, high-priority messages may be sent. The message parameters may further specify that if all high-priority messages have been sent and the maximum-count number permits, then regular-priory messages may be sent. Still further, the embedded message parameters may specify the maximum number of messages that may be included in a single response.

As represented at block 220, upon receiving the message request 124, the messaging service 108 builds a response message 128 according to the message parameters included in the message request 124 and sends the response message 128 to the mobile device 104. According to an embodiment, multiple messages may be concatenated in the response message 128. Further, according to an embodiment, the response message 128 includes an indication of whether additional messages are still pending delivery from the messaging service 108 to the mobile device 104. According to some embodiments, this indication may be an indication of whether messages of a particular priority are still pending delivery. For example, the message parameters of the message request 124 may specify that the response message 128 include a maximum of ten messages and that the response message 128 can only include urgent priority messages. According to this example, if eleven urgent priority messages are pending delivery, then the message service 108 builds a response message 128 that includes ten of the eleven urgent priority messages. Further, according to this example, the message service 108 includes in the response message 128 an indication that one urgent priority message is still pending delivery.

Upon receiving the response message 128 from the message service 108, the mobile device 104 determines whether messages are still pending delivery, as indicated at decision block 228. According to an embodiment, the mobile device 104 determines whether messages are still pending delivery based on whether the response message 128 includes an indication that more messages are pending delivery. If no messages are pending delivery, then the process 200 ends. However, if messages are still pending delivery and if the mobile device is still accepting messages of the priority level for which messages are still pending delivery, the process 200 returns to the step indicated at block 212, where the mobile device 104 builds and sends another message request 124.

An example will now be provided for the purpose of illustrating aspects of the process 200. According to this example, the mobile device 104 embeds message parameters in the message request 124 and sends the message request 124 to the messaging service 108 (block 212). The embedded message parameters, according to this example, specify that the messaging service 108 is to build and send a response message 128 that includes a maximum of ten messages and that only includes urgent and high priority messages. Further, according to this example, fifteen messages are pending delivery from the messaging service 108 to the user. Four of the pending messages are urgent priority, eight of the pending messages are high priority, and three of the pending messages are regular priority. Upon receiving the example message request 124, the messaging service 108 builds and sends a response message 128 that includes the four pending urgent priority messages and six of the pending high priority messages (block 220). Further, the response message 128 includes an indication that two high priority messages and three regular priority messages are still pending delivery. Upon receiving the response message 128, according to this example, the mobile device 104 processes the indication that two high priority messages are still pending delivery (decision block 228).

As such, the mobile device 104, according to this example, builds and sends a second message request 124 (block 212). The second message request 124, like the first message request, includes embedded message parameters that instruct the messaging service 108 to build and send a response message 128 that includes a maximum of ten messages and that only includes urgent and high priority messages. Upon receiving the second message request 124, according to this example, the messaging service 108 builds and sends a second response message 128 that includes the two pending high priority messages (block 220). The regular priority messages are excluded from the second message request 124 because the message parameters of the second message request 124, like those of the first message request, specify that only urgent and high priority messages are to be included in the response message 128. Further, according to this example, the messaging service 108 includes an indication that no urgent or high priority messages are pending and three regular priority messages are pending. As such, according to this example, the process 200 ends when the mobile device 104 receives the second response message 128 and determines that there are no more pending urgent or high priority messages (decision block 228). It should be appreciated that the mobile device 104 may be configured to decide whether to send another message request for the purpose of retrieving the three regular priority messages that are still pending.

Figure 3:
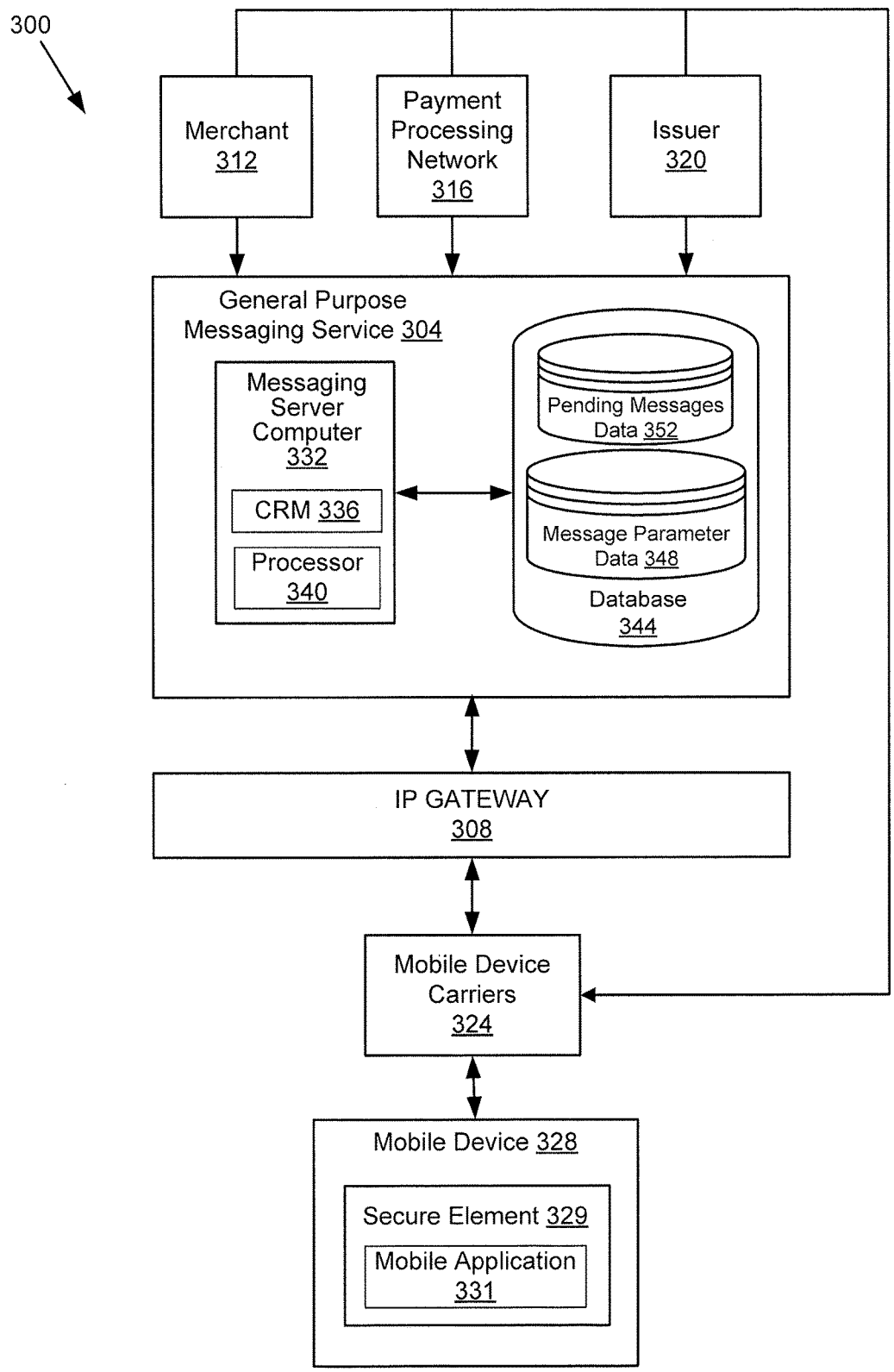
FIG. 3 shows aspects of a messaging system, according to an embodiment of the invention.

FIG. 3 is a diagram illustrating a messaging system 300, in accordance with an embodiment of the invention. The messaging system 300 includes a general purpose messaging service 304, an IP gateway 308, a merchant 312, a payment processing network 316, an issuer 320, mobile device carriers 324, and a mobile device 328. Although one mobile device 328, one merchant 312, one payment processing network 316, and one issuer 320 are shown, there may be any suitable number of any of these entities in the messaging system 300.

The IP Gateway 308 is in communication with the general purpose messaging service 304 and the mobile device carriers 324, which are in operative communication with the mobile device 328. The mobile device 328 is in operative communication with a user for displaying messages to the user and for receiving instructions from the user. The messages are generated from the merchant 312, the payment processing network 316, and/or the issuer 320, and then the messages are sent to the general purpose messaging service 304. In some embodiments, the mobile device 328 selectively "pulls" messages from the general purpose messaging service 304 via the mobile device carriers 324 and the IP Gateway 308. In other embodiments, the merchant 312, the payment processing network 316, and/or the issuer 320 "push" messages to the mobile device 328 via the general purpose messaging service 304, the IP Gateway 308 and the mobile device carriers 324.

According to some embodiments, the various components of system 300 may be incorporated into and/or be implemented by the system 100 of FIG. 1. Further, according to some embodiments, the systems 100 and 300, either combined or individually, are capable of implementing process 200 as well as processes 500 and 600. The arrows shown in FIG. 3 between the various components of system 300 indicate that the various components are communicatively coupled, for example, by a network.

Each of the components shown in FIG. 3 is described in further detail below.

The general purpose messaging service 304 includes a message server computer 332 having a computer-readable medium (CRM) 336, and a processor 340 that is coupled to the CRM 336. Although one CRM 336 and one processor 340 are shown in FIG. 3, the message server computer 332 may house more than one CRM and/or processor as needed. The message server computer 332 is in communication with database 344. In some embodiments, database 344 may be included in the message server computer 332. Database 344, for example, contains message data, which may include pending messages data 352 and message parameter data 348. The pending messages data 352 contains data related to messages from the merchant 312, the payment processing network 316, and/or the issuer 320 that are pending delivery to the user via the mobile device 328.

The message parameter data 348, for example, contains instructions for processing the data elements embedded in message requests received from users' mobile devices. For example, the message parameter data 348 may include tables that list data elements and corresponding message parameters. Accordingly, upon receiving a message request having data elements embedded therein, the messaging server computer 332 may access the message parameter data 348 to determine which message parameters correspond to the embedded data elements. Then, the messaging server computer 332 applies the message parameters to the messages that are located in the pending messages data 352 and that are pending delivery to the mobile device 328. The general purpose messaging service 304 then sends the pending messages to the mobile device 328 in accordance with the message parameters that correspond with the data elements embedded in the message request.

Merchant 312 refers to any suitable entity or entities that transact with users. Merchants 312 may use any suitable method to make the transactions. For example, merchants 312 may use e-commerce businesses to enable the transactions to be conducted via the Internet. Other examples of merchants 312 include department stores, gas stations, drug stores, grocery stores, or other suitable businesses.

Payment processing network 316 refers to a network of suitable entities that have information related to user accounts. This information includes data associated with user accounts such as user profile information, data, and other suitable information.

Payment processing network 316 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

Payment processing network 316 may include data processing subsystems, networks, and operations used to support and deliver authorization services, exception file services, and clearing and settlement services. An exemplary payment processing network 316 may be VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 316 may use any suitable wired or wireless network, including the Internet.

Issuer 320 refers to any suitable entities that may open and maintain user accounts. Some examples of issuers 320 may include banks, business entities such as retail stores, and governmental entities.

The IP Gateway 308 refers to an entity that processes messages sent between mobile devices 328 and the general purpose messaging service 304. The IP Gateway 308 may additionally generate and send messages. The IP gateway 308 may include one or more servers and databases for processing message requests sent between mobile devices 328 and the general purpose messaging service 304. The IP Gateway 308 may be part of the general purpose messaging service 304 or may be a separate entity in communication with the general purpose messaging service 304.

Message server computer 332 may be a powerful computer or cluster of computers. For example, the server computer can be a large mainframe, a minicomputer cluster, or a group of servers functioning as a unit. In one example, the message server computer may be a database server coupled to a Web server.

The database 344 may be in the form of one or more server computers for storage of data. It may also be in the form of one or more electronic storage units (standalone hard drives) capable of storing electronic data.

Mobile device carriers 324 refer to entities that provide wireless infrastructures for wireless data transfer and communication via cellular phone or other mobile devices. Examples of such entities include AT&T™, Verizon Wireless™, T-Mobile™, etc.

The mobile device 328 may be in any suitable form. The mobile device 328 may include a secure element 329 to securely hold a mobile application 331. The mobile application 331 can send and receive message requests and message responses and display the message responses to the user.

The secure element 329 provides the following capabilities. It can provide secure storage to protect sensitive data. This includes private keys associated with the phone and consumer, public keys, and credentials associated with issuers and back end systems. It can also provide the ability to securely store consumer-specific personal information, such as messages received from the messaging service 304. It can also provide cryptographic functions to support data integrity and confidentiality. This includes support for encryption/decryption, signature verification, and authentication of secure SMS messages received from message sending entities and the messaging service, and other back end systems. It can also provide secure deployment and execution environment for the mobile application 331.

It is understood that, although the specific examples described herein include the use of a mobile application within a secure element, embodiments of the invention are not limited to this.

The secure element 329 can be, for example, provided in one of the following forms: embedded hardware, which is a tamper-proof hardware smart card with contactless capability that is integrated tightly with the mobile phone; removable Universal Subscriber Identity Module (USIM), which is a secure element that can be integrated with a USIM card that provides smart card functionality (in this case, the contactless capability is separate); or a removable Secure Digital (SD) card, which is a smart card that provides a secure programmable environment. Applications are provisioned on the smart card. The communication to the secure element on the smart card uses APDU commands.

The secure element 329 can also provide an integrated NFC capability that supports the ISO 14443 standard. The NFC capability provides support for peer-to-peer, reader/writer, and card emulation modes.

The mobile application 331 includes a user interface for account management, setting message parameters and other preferences, sending message requests, and receiving response messages. The mobile application 331 may be, for example, a J2 ME/MIDP 2.0 application (MIDlet). Mobile Information Device Profile (MIDP) may be the specification published for the use of Java on embedded devices such as mobile phones. The mobile application 331 may be customized and configured for a specific issuer.

Figure 4:
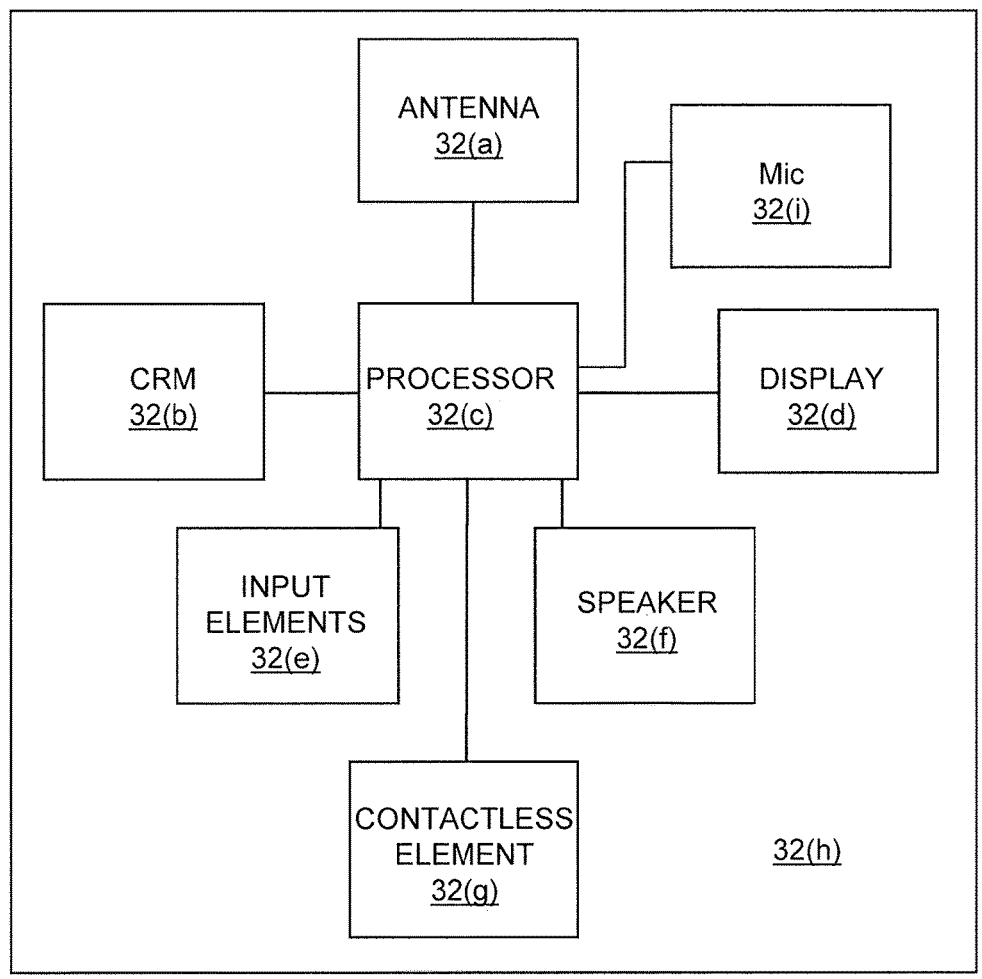
FIG. 4 shows an exemplary mobile device, according to an embodiment of the invention.

FIG. 4 shows a block diagram of the exemplary mobile device 328. The exemplary mobile device 328 may comprise a computer-readable medium and a body. The computer-readable medium 32(b) may be present within the body 32(h), or may be detachable from it. The body 32(h) may be in the form a plastic substrate, housing, or other structure. The computer-readable medium 32(b) may be a memory, such as a tangible (i.e. physical or durable) memory that stores data and may be in any suitable form including a hard drive, magnetic stripe, a memory chip, uniquely derived keys (such as those described above), encryption algorithms, etc. The memory also preferably stores information such as financial information, such as payment account information, a bank identification number (BIN), credit or debit card number information, account balance information, an expiration date, consumer information such as name, date of birth, etc. Any of this information may be transmitted by the mobile device 328.

The mobile device 328 may further include a contactless element 32(g), which is typically implemented in the form of a semiconductor chip (or other data storage element) with an associated wireless transfer (e.g., data transmission) element, such as an antenna. Data or control instructions transmitted via a cellular network may be applied to contactless element 32(g) by means of a contactless element interface (not shown). The contactless element interface may function to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile device 328 and an interrogation device. Thus, the mobile device 328 is capable of communicating and transferring data and/or control instructions via both cellular network and near field communications capability.

The mobile device 328 may also include a processor 32(c) (e.g., a microprocessor or a group of processors working together) for processing the functions of the mobile device 328 and a display 32(d) to allow a user to see phone numbers and other information and messages. The mobile device 328 may further include input elements 32(e) to allow a user to input information into the device, a speaker 32(f) to allow the user to hear voice communication, music, etc., and a microphone 32(i) to allow the user to transmit her voice through the user mobile device 328. The mobile device 328 may also include an antenna 32(a) for wireless data transfer (e.g., data transmission).

Figure 5:
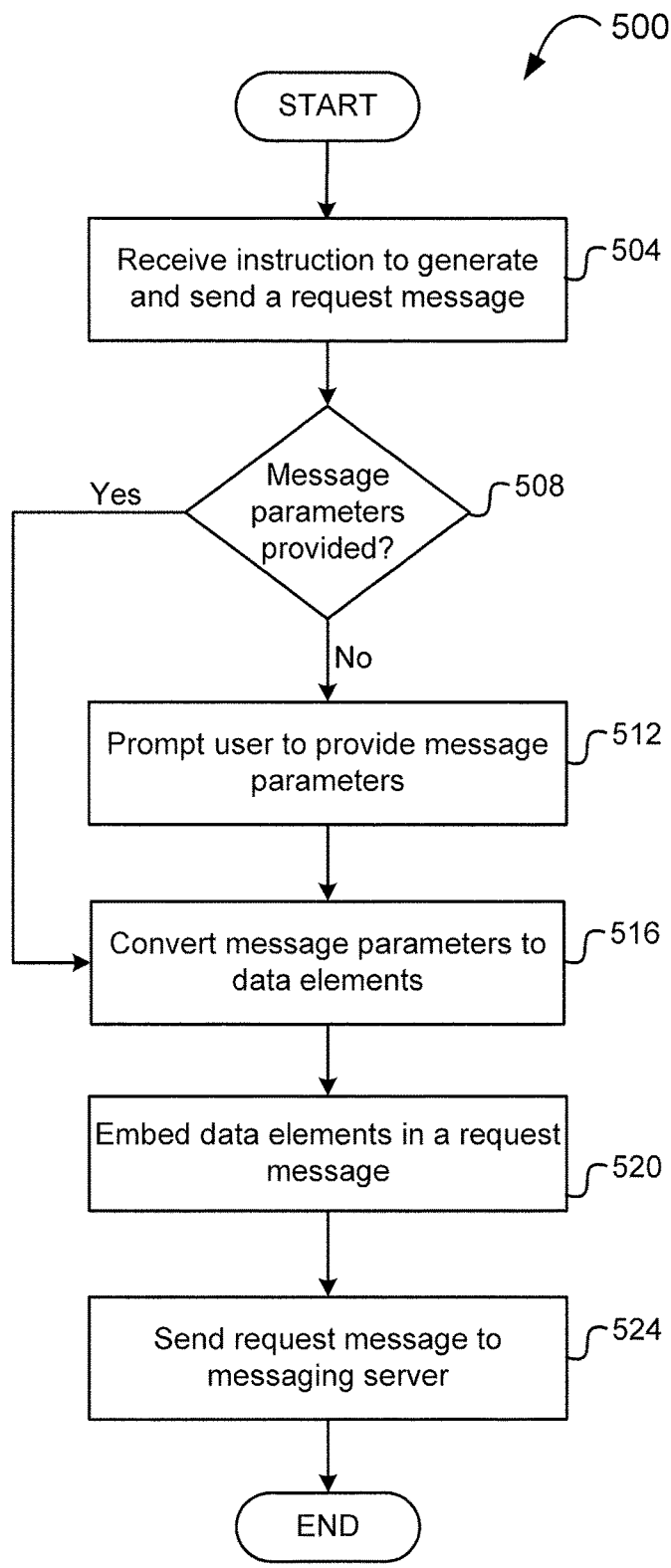
FIG. 5 is a flowchart illustrating example steps involved in building and sending a message request having message parameters included therein, according to an embodiment of the invention.

FIG. 5 shows a flowchart illustrating an example process 500 whereby a mobile device builds and sends a message request to a message server, where the message request requests that the message server send pending messages to the mobile device. For illustrative convenience, the process 500 is described below as being implemented in system 300 of FIG. 3 to cause mobile device 328 to retrieve pending messages from general purpose messaging service 304. However, it should be appreciated that the process 500 could be implemented in system 100 of FIG. 1 to cause mobile device 104 to retrieve pending messages from messaging service 108. Further, it should be appreciated that the process 500 could be implemented in any suitable system, including a combination of some or all of the components of systems 100 and 300, to cause a client to retrieve pending messages from a server. Still further, it should be appreciated that process 500 may be executed to accomplish the "build and send message request" step represented by block 212 of process 200, which is illustrated in FIG. 2.

As indicated at block 504, the process 500 generally begins with receiving instruction to build and send a message request to retrieve pending messages from a message server. For example, according to an embodiment, the mobile device 328 receives instruction from a user to build and send a message request to retrieve pending messages from the general purpose messaging service 304. To give the instruction, the user may access a mobile application 331 running on the mobile device 328 and input an instruction that causes the mobile device 328 to build and send a message request configured to cause the general purpose messaging service 304 to send pending messages to the mobile device 328. Further, according to an embodiment, instead of manually accessing the mobile application 331 to input instruction each time the user desires to receive messages, the user may access the mobile application 331 to provide a schedule that periodically causes the mobile device 328 to build and send message requests. Further, for example, a mobile application 331 running on the mobile device 328 may be configured to build and send message requests upon the occurrence of a trigger event, such as the receipt of a "wake up" message, the initial launch of the mobile application 331, etc.

According to some embodiments, the message request sent from the mobile device 328 to the general purpose messaging service 304 may be a data stream including multiple data elements, such as the data elements listed in Fields 1-8 of Table 1 below.

TABLE 1

Message request Data Fields

| Field# | Data Element | Length | Description |
|---|---|---|---|
| 1 | Message ID | 2 | ID of the Message request |
| 2 | Message Format Version | 1 | Version of the message format |
| 3 | Message request Sequence Number | 1 | An identifier used to match a Response Message with the corresponding Message request |
| 4 | Last Successful Received Response Message Sequence Number | 1 | The Received Sequence Number in the last Response Message received from the same Messaging Server to which the Message request is being sent, and for which all the messages in the Response Message were successfully received by the mobile application running on the mobile device |
| 5 | Message request Parameters | 2 | Parameters used by the Mobile Application to request special processing of the Message request in the Messaging Server |
| 6 | Mobile Application Identifier | 10 | Unique identifier of the mobile application on the handset from which the Message request is being sent |

TABLE 1-continued

Message request Data Fields

| Field# | Data Element | Length | Description |
| --- | --- | --- | --- |
| 7 | Length of Mobile Application Account ID | 1 | Indicates the length of Mobile Application Account ID |
| 8 | Mobile Application Account ID | Var. (≤16) | Unique identifier of the account in the Mobile Application with which the general purpose messages are associated |

With reference to Table 1, the Message ID data element may identify the message request, the Mobile Application Identifier data element may identify the mobile application 331 running on the mobile device 328 from which the message request was sent, and the Mobile Application Account ID data element may include a series of numbers that identify the account associated with the mobile application 331 running on the mobile device 328.

With further reference to Table 1, the message request may include a Message Request Sequence Number data element and a Last Successful Received Response Message Sequence Number data element. The Message Request Sequence Number data element may be a counter value unique to each message request sent from the mobile device 328, and may sequentially increase from message request to message request. For example, the Message Request Sequence Number data element of the first message request sent from the mobile device 328 may be a counter value of 1, the corresponding data element of the second message request may be a counter value of 2, and the corresponding data element of third message request may be a counter value of 3. Similarly, the Last Successful Received Response Message Sequence Number data element may be a counter value unique to each response message received from the general purpose messaging service 304, and may sequentially increase from response message to response message. The Message Request Sequence Number data element and the Last Successful Received Response Message Sequence Number data element may be used to match corresponding message requests and response messages.

When building a message request, the mobile device 328 may set the Last Successful Received Response Message Sequence Number data element to the counter value of the last response message that the mobile device 328 received from the general purpose messaging service 304. If, for example, the last response message received by the mobile device 328 had a counter value of 2, then the mobile device 328 would set the Last Successful Received Response Message Sequence Number data element of its message request to a counter value of 2. Thus, upon receiving the message request from the mobile device 328, the general purpose messaging service 304 would compare the counter value of the Last Successful Received Response Message Sequence Number data element that the mobile device 328 included in the message request to the counter value of the last response message that the general purpose messaging service 304 sent to the mobile device 328. This comparison enables the general purpose messaging service 304 to determine whether the mobile device 328 received the last response message sent from the general purpose messaging service 304.

After receiving instructions to build and send a message request, the process 500, as indicated at block 508, involves determining whether message parameters have been provided. According to an embodiment, the message parameters may be manually provided by the user when the user accesses mobile application 331 to instruct to the mobile device 328 to build and send a message request. According to other embodiments, the message parameters are automatically provided by the mobile application 331 running on the mobile device 328. In the latter embodiment, for example, the mobile application 331 running on the mobile device 328 may be programmed to include certain message parameters in certain message requests. For example, the mobile application 331 may be programmed to enable the user to access the mobile application 331 and specify which message parameters to include in certain message requests. The mobile application 331 may save and automatically apply the user's specifications to future message requests. The user may specify, for example, that for any message request sent during business hours, the mobile application 331 is to include message parameters that only request urgent messages from the general purpose messaging service 304. Thus, the user avoids being interrupted with non-urgent messages during business days when the user is presumably working. The user may further specify a schedule that dictates that the mobile application 331 is to build and send message requests during even hours, where the message requests include message parameters that request standard priority messages.

If message parameters have not been provided, the process 500 involves prompting the user to provide message parameters, as indicated at block 512, else the process 500 proceeds to the step indicated at block 516. According to some embodiments, to execute the step represented by block 512, the mobile application 331 running on the mobile device 328 prompts the user to enter message parameters. For example, the mobile application 331 may prompt the user to input the priority designation of messages the user would like to receive and when the user would like to receive those messages. The user may select message parameters that specify that the general purpose messaging service 304 may send messages in response the message request if the messages are: urgent; urgent or high priority; or urgent, high priority, or regular priority. Further, for example, the mobile application 331 may prompt the user to select message parameters that specify a maximum number of messages that the general purpose messaging service 304 may send to the mobile device in response to the message request and the order in which the general purpose messaging service 304 may send the messages. The user may select message parameters that specify that urgent messages are to be sent first and then, if all urgent messages have been sent and the maximum-count number permits, high-priority messages may be sent. The selected message parameters may further specify that, if all high-priority messages have been sent and the maximum-count number permits, then regular-priory messages may be sent.

As indicated at block 516, the process 500 further involves converting the message parameters to data elements. According to an embodiment, the mobile application 331 running on the mobile device 328 converts the message parameters to data elements. Table 2 below provides a list of message parameters and corresponding data elements.

TABLE 2

Message Parameters and Corresponding Data Elements

| Byte | b8 | b7 | b6 | b5 | b4 | b3 | b2 | b1 | Usage |
|---|---|---|---|---|---|---|---|---|---|
| 1 | x | x | | | | | | | Priority Restrictions |
| | 0 | 0 | | | | | | | Send urgent, high, and regular priority messages |
| | 0 | 1 | | | | | | | Send only urgent and high priority messages |
| | 1 | 0 | | | | | | | Send only urgent priority messages |
| 1 | | | | x | x | | | | Maximum Message Count for Response Messages |
| | | | | 0 | 0 | | | | Send all messages |
| | | | | 0 | 1 | | | | Send only one message |
| | | | | 1 | 0 | | | | Send no more than Message Count Limit messages |
| 2 | x | x | x | x | x | x | x | x | Message Count Limit |

As indicated at block 520, after the message parameters are converted to data elements, the data elements are embedded in the message request. Then, as indicated at block 524, the message request having the message parameters embedded therein as data elements is sent to the general purpose messaging service 304.

Figure 6:
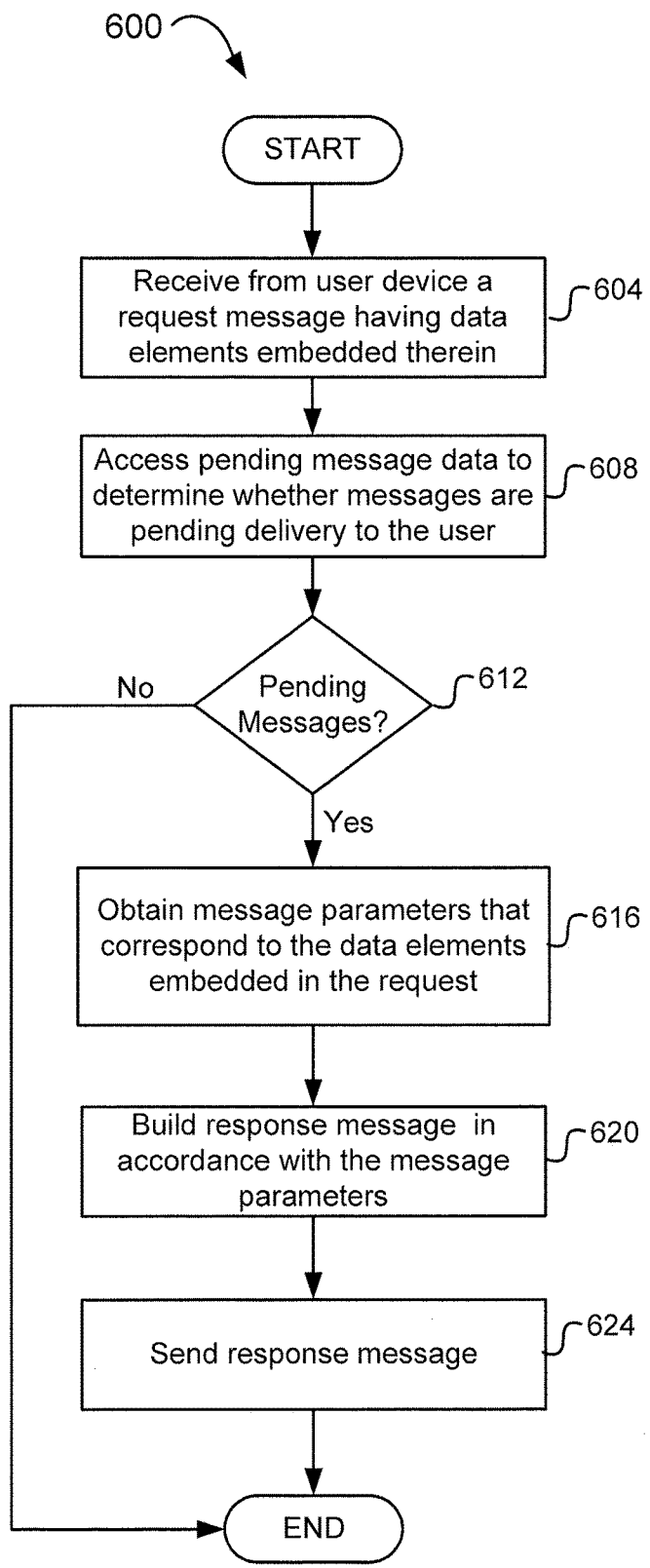
FIG. 6 is a flowchart illustrating example steps involved in building and sending a response message in accordance with message parameters specified in a message request, according to an embodiment of the invention.

Upon receiving a message request from a mobile device, a message server builds and sends a response message to the mobile device according to example process 600 illustrated in FIG. 6. For illustrative convenience, the process 600 is described below as being implemented in system 300 of FIG. 3. However, it should be appreciated that the process 600 could be implemented in system 100 of FIG. 1. Further, it should be appreciated that the process 600 could be implemented in any suitable system, including a combination of some or all of the components of systems 100 and 300. Still further, it should be appreciated that process 600 may be executed to accomplish the "build and send response" step represented by block 220 of process 200, which is illustrated in FIG. 2.

As indicated at block 604, the process 600 generally begins with receiving from the mobile device 328 a message request having data elements embedded therein. The message request requests that the general purpose messaging service 304 send pending messages to the mobile device 328 in accordance with message parameters that correspond to the embedded data elements. Next, as indicated at block 608, the process 600 involves accessing pending messages to determine whether messages are pending delivery to the user of the mobile device 328 that sent the message request. For example, upon receipt of a message request from the mobile device 328, the messaging server computer 332 of the general purpose messaging service 304 may access the pending messages data 352 to determine whether any messages are pending delivery to the user of the mobile device 328. As indicated at block 612, if no messages are pending delivery to the user, the process 600 ends, else the process 600 proceeds to the step that is indicated at block 616 and that involves determining the message parameters that correspond to the data elements embedded in the message request.

According to an embodiment, to execute the step indicated at block 616, the messaging server computer 332 of the general purpose messaging service 304 accesses the message parameter data 348 to obtain the message parameters that correspond to the data elements embedded in the message request. For example, the message parameter data 348 may include a lookup table, such as Table 2 provided above, that lists data elements and corresponding message parameters. In this example, the messaging server computer 332 accesses the lookup table and identifies the message parameters that correspond to the data elements embedded in the message request.

As indicated at block 620, after the message parameters have been obtained, the process 600 involves building a response message in accordance with the message parameters. According to some embodiments, the response message may be a data stream including multiple data elements, such as the data elements provided in Fields 1 through (10+2n) of Table 3 below.

TABLE 3

Response Message Data Fields

| Field# | Data Element | Length | Description |
|---|---|---|---|
| 1 | Message ID | 2 | ID of the Response Message |
| 2 | Message Format Version | 1 | Version of the message format |
| 3 | Length of Response Message | 2 | Indicates the total length of the remaining fields in the Response Message |
| 4 | Received Sequence Number | 1 | A counter value used to match a Response Message with the corresponding Message request. |
| 5 | Mobile Application Identifier | 10 | Unique identifier of the mobile application on the mobile device to which the Response Message is sent |
| 6 | Length of Mobile Application Account ID | 1 | Indicates the length of Mobile Application Account ID |
| 7 | Mobile Application Account ID | Var. (≤16) | Unique identifier of the account in the Mobile Application with which the general purpose messages are associated |
| 8 | Urgent Priority Messages Remaining | 1 | Indicates the number of urgent priority messages remaining to be sent from the Message Server |

TABLE 3-continued

Response Message Data Fields

| Field# | Data Element | Length | Description |
|---|---|---|---|
| 9 | High Priority Messages Remaining | 1 | Indicates the number of high priority messages remaining to be sent from the Message Server |
| 10 | Regular Priority Messages Remaining | 1 | Indicates the number of regular priority messages remaining to be sent from the Message Server |
| (9 + 2n) | Message 1 | Var. | $n^{th}$ General Purpose Message concatenated in the Response Message |
| (10 + 2n) | Message n | Var. | $n^{th}$ General Purpose Message concatenated in the Response Message |

With reference to Table 3, the response message, like the message request, may include, among other things, a Message ID data element, a Mobile Application Identifier data element, and Mobile Application Account ID data element. The Message ID data element may identify the response message, the Mobile Application Identifier data element may identify the mobile application 331 running on the mobile device 328 to which the response message is being sent, and the Mobile Application Account ID data element may identify an account associated with the mobile application 331. It should be appreciated that the Mobile Application Account ID is included so that multiple accounts may be associated with a mobile application 331.

The response message may further include a Received Sequence Number data element, which may have a counter value set to the counter value of the corresponding message request sent from the mobile device 328. For example, if the Message Request Sequence Number data element of the message request received from the mobile device 328 has a counter value of 1, then the Received Sequence Number data element of the corresponding response message will have a counter value of 1. The Received Sequence Number data element of response messages and the Message Request Sequence Number data element of message requests may be used to match corresponding message requests and response messages.

The response message may also include Urgent Priority Messages Remaining, High Priority Messages Remaining, and Regular Priority Messages Remaining data elements. The value of the data elements represents the number of messages of each of the respective priorities remaining in the general purpose messaging service 304 after the response message has been built and sent to the mobile device 328. Thus, upon receiving the response message, the mobile device 328 can determine whether one or more additional messages remain pending on the general purpose messaging service 304 and whether to construct and send another message request. These data elements are advantageous in situations where, for example, the message parameters of the message request specify that the response message include a maximum number concatenated messages but more than that maximum number of messages are pending in the general purpose messaging service 304. For example, the message parameters of the message request may specify that the response message include a maximum of ten concatenated messages and that the response message only include urgent priority messages. In this example, if eleven urgent priority messages are pending delivery, then the message server builds a response message that includes ten of the eleven urgent priority messages. Further, according to this example, the general purpose messaging service 304 sets the Urgent Priority Messages Remaining data element of the response message to 1. Thus, upon receipt of the response message, the mobile device 328 determines that one urgent priority message is still pending delivery and sends another message request to the general purpose messaging service 304.

As mentioned above, according to an embodiment, multiple messages may be concatenated in a single response message. Thus, as indicated in Fields (9+2n) and (10+2n) of Table 3 above, a message field may be provided for each message concatenated in the response message. Exemplary contents of each message concatenated in the response message are described below in Table 4.

TABLE 4

Contents of Message Concatenated in Response Messages

| Field# | Data Element | Length | Description |
|---|---|---|---|
| 1 | Message Format Version | 1 | Version of the message format |
| 2 | Length of Message | 2 | Indicates the length of the message |
| 3 | Response Parameters | 1 | Identifies special parameters associated with the message content |
| 4 | Message Timestamp | 7 | A timestamp identifying the date and time when the message content was created by the originator, in the format YYYYMMDDHHMMSS |
| 5 | Originator ID | 1 | Identifies the originator of the message |
| 6 | Category ID | 1 | Identifies the categorization of the message |
| 7 | Length of Message Content | 2 | Indicates the length of message content |
| 8 | Message Content | Var. | Actual contents of the message to be displayed to the user by the mobile application |
| 9 | Length of Message Expiry Date | 1 | Indicates the length of the Message Expiry Data (Field 10) |

TABLE 4-continued

Contents of Message Concatenated in Response Messages

| Field# | Data Element | Length | Description |
|---|---|---|---|
| 10 | Message Expiry Date | 4 | An optional field identifying the date after which the message may be automatically deleted by the mobile application, in the format YYYYMMDD |

With reference to Table 4, the messages, which are concatenated in response messages, may include, in addition to the actual Message Content, Message Format Version, Length of Message, Message Timestamp, Originator and Category ID, and Message Expiry Date data elements. Further, the messages may include Response Parameters. According to an embodiment, the Response Parameters are converted into data elements and embedded in response messages. Table 5 below provides an example list of Response Parameters and corresponding data elements.

TABLE 5

Contents of Message Concatenated in Response Messages

| b8 | b7 | b6 | b5 | b4 | b3 | b2 | b1 | Usage |
|---|---|---|---|---|---|---|---|---|
| x | x | | | | | | | Message Priority |
| 0 | 1 | | | | | | | Regular priority message |
| 1 | 0 | | | | | | | High priority message |
| 1 | 1 | | | | | | | Urgent priority message |

According to an embodiment, the mobile application 331 processes the Response Parameters data elements to determine the priority of the individual messages provided in the message response. The mobile application 331 may display messages to the user in accordance with the respective priority of the messages. For example, the mobile application 331 may display urgent priority messages to the user immediately upon receipt from the general purpose messaging service 304. The mobile application 331 may even force the user to view urgent priority messages before the user can proceed with other mobile functions. Further for example, the mobile application 331 may display high priority messages to the user if the mobile application 331 is launched. Still further, for example, the mobile application 331 may display regular priority messages at the user's discretion.

As indicated at block 624, after building a response message in accordance with the message parameters specified by the message request, the response message is sent to the mobile device.

Figure 7:
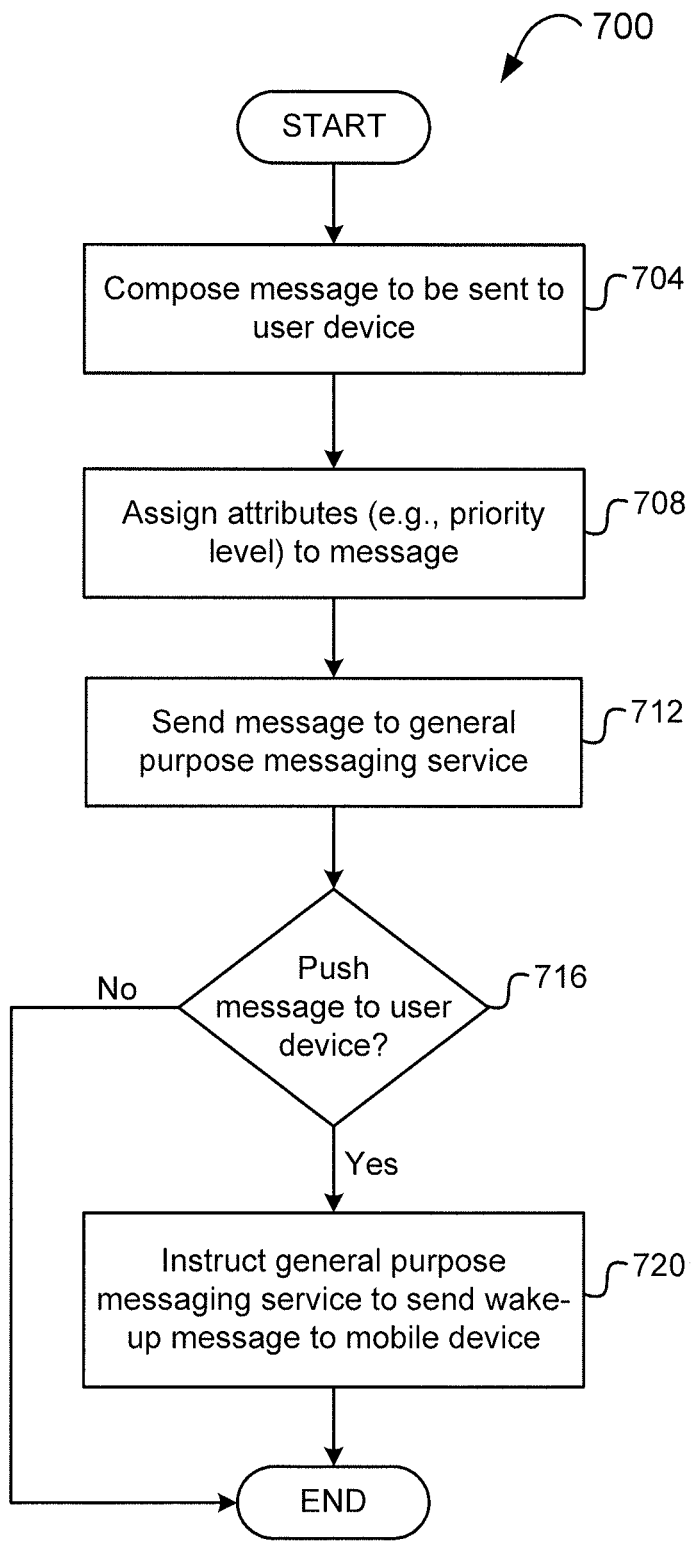
FIG. 7 is a flowchart illustrating the steps involved in submitting a message to a messaging server for eventual delivery to a user, according to a second embodiment of the invention.

FIG. 7 shows a flowchart illustrating an example process 700 whereby message-sending entities, such as payment processing networks, issuers, and merchants, send messages designated for users to a message server, which then sends the messages to mobile devices associated with the users. For illustrative convenience, the process 700 is described herein as being implemented in system 300 of FIG. 3. However, it should be appreciated that the process 700 could be implemented in system 100 of FIG. 1. Further, it should be appreciated that the process 700 could be implemented in any suitable system, including a combination of some or all of the components of systems 100 and 300.

As indicated at block 704, the process 700 generally begins with composing a message to be sent to the user. The message may be, for example, an account-related message from an issuer 320 informing the user that his or her checking account recently dropped below a threshold amount or that his or her credit-card account is approaching its credit limit. Also, for example, the message may be a promotional offer, a coupon, a communication regarding affinity programs, or any other type of marketing message from a merchant 312. As indicated at block 708, the process 700 further involves assigning attributes to the message. For example, the message-sending entity, such as the merchant 312, the payment processing network 316, or the issuer 320, may include data elements in the message that indicate the message is urgent, high, or regular priority. The priority designations for messages may be determined by the message-sending entity 312, 316, 320 based on business rules, which may be determined by the entity responsible for managing the general purpose messaging service 304. For example, the business rules may specify that all promotional messages be designated as regular priority, that account-related messages, such as notification that a charge recently posted against a checking account, may be designated as high priority, and that account-related messages, such as a fraud notification, may be designated as urgent priority.

After composing the message and assigning attributes to the message, the process 700 involves sending the message to the general purpose messaging service 304, as indicated at block 712. As indicated at block 716, if the message-sending entity 312, 316, 320 does not desire to "push" the message to the mobile device 328 of the user, then the process 700 ends. However, if the message-sending entity 312, 316, 320 desires to "push" the message to the mobile device 328 of the user, then the process 700 involves sending a "wake up" message to the mobile device 328, as indicated at block 720. The "wake up" message is configured to cause the mobile application 331 running on the mobile device 328 to send a message request to the general purpose messaging service 304 and thereby retrieve the "push" message from the general purpose messaging service 304.

According to an embodiment, the "wake up" message is sent to the mobile device 328 concurrent with or immediately after the message-sending entity 312, 316, 320 sends the "push" message to the general purpose messaging service 304. Thus, the mobile device 328 receives the "wake up" message, sends a message request, and receives the message from the general purpose messaging service 304 soon after the message-sending entity sent the "push" message 312, 316, 320.

According to an embodiment, upon sending the message to the general purpose messaging service 304 according to the step indicated at block 712, the message-sending entity 312, 316, 320 indicates to the general purpose messaging service 304 that the message is a "push" message, and, in response, the general purpose messaging service 304 sends the "wake up" message to the mobile device 328 of the user. It should be appreciated, however, that the message-sending entity 312, 316, 320, instead of the general purpose messaging service 304, could send the "wake up" message to the mobile device 328 of the user.

The "wake up" message may be, for example, an SMS or WAP message depending on, among other things, the capabilities of the mobile device 328. The payload of the SMS/WAP message holds bytes that initiate the desired behavior in mobile application 331 of the mobile device 328. For example, the payload may include bytes that identify the SMS or WAP message as a "wake up" message, the general purpose messaging service 304 to which the mobile application 331 must send a message request, and the account in the mobile application 331 with which the pending message is associated.

Figure 8:
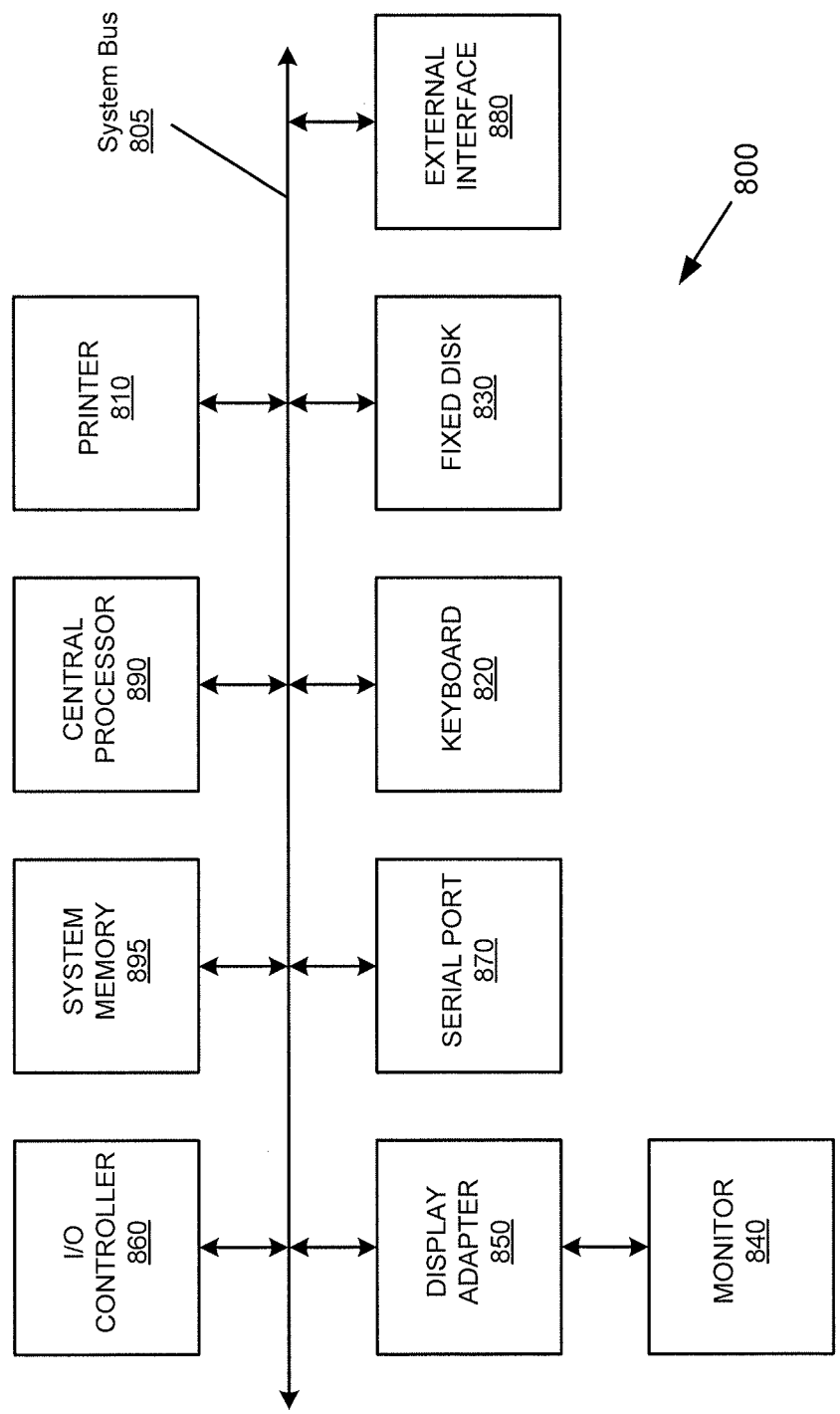
FIG. 8 shows a system according to an embodiment of the invention.

The various elements of the previously described system diagrams (e.g., FIGS. 1-4) may use any suitable number of subsystems to facilitate the functions described herein. Examples of such subsystems or components are shown in FIG. 8. The subsystems 800 shown in FIG. 8 are interconnected via a system bus 805. Additional subsystems such as a printer 810, keyboard 820, fixed disk 830 (or other memory comprising computer-readable media), monitor 840, which is coupled to display adapter 850, and others are shown. Peripherals and input/output (I/O) devices, which couple to I/O controller 860, can be connected to the computer system by any number of means known in the art, such as serial port 870. For example, serial port 870 or external interface 880 can be used to connect the computer apparatus to a wide area network such as the Internet, a mouse input device, or a scanner. The interconnection via system bus allows the central processor 890 to communicate with each subsystem and to control the execution of instructions from system memory 895 or the fixed disk 830, as well as the exchange of information between subsystems. The system memory 895 and/or the fixed disk 830 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed. For example, any of the functions described for the notification server may be performed by a processor in the notification server, which may execute code on a computer-readable medium. As a further example, any of the functions described for a user device may be performed by a processor in the user device, which may execute code on a computer-readable medium.

Any recitation of "a", "an" or "the" is intended to mean "one or more" unless specifically indicated to the contrary.

One or more features of the various embodiments described above, may be combined with other features of other embodiments in any suitable manner without departing from the scope of the invention. The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   building, by a user device, a first message request to be sent to a messaging server computer, the first message request including data elements corresponding to message parameters specified by a user of the user device, the first message request configured to cause the messaging server computer to send the user device a first set of pending messages designated for the user and satisfying the message parameters, wherein building the message request comprises
      obtaining, by the user device, the message parameters,
      converting, by the user device, the message parameters into the data elements, and
      embedding, by the user device, the data elements in the first message request;
   sending, from the user device to the messaging server computer, the first message request having embedded therein the data elements corresponding to the message parameters, wherein the first message request having the data elements embedded therein enables the messaging server computer to identify and send back to the user device pending messages satisfying the user's message parameters;
   receiving, by the user device, a first response message, including the pending messages satisfying the user's message parameters;
   retrieving, by the user device, a message sequence number from the first response message;
   generating, by the user device, a second message request including the message sequence number;
   sending, from the user device to the messaging server computer, the second message request, wherein the messaging server computer determines that the message sequence number matches a stored message sequence number; and
   receiving, by the user device, a second response message, the second response message including a second set of pending messages.

2. The method of claim 1, wherein the message parameters specify an order in which the messaging service is to send the pending messages.

3. The method of claim 2, wherein the order specified by the message parameters is:
   send the pending messages that are of an urgent priority level;
   if all of the pending messages that are of the urgent priority level have been sent and if the maximum number has not been reached, send the pending messages that are of a high priority level; and
   if all of the pending messages that are of the high priority level have been sent and if the maximum number has not been reached, send the pending messages that are of a regular priority level.

4. The method of claim 1, further comprising:
   detecting, by the user device, the occurrence of a trigger event to initiating the building of the first message request.

5. The method of claim 1, wherein the message request further comprises:
embedding, by the user device, a message format version in the first message request.

6. The method of claim 1, wherein the user device is a mobile phone comprising a mobile application for sending the first message request and receiving the first response message.

7. A computer comprising:
a processor; and
a non-transitory computer-readable storage medium, comprising code executable by the processor for implementing a method comprising:
building a first message request to be sent to a messaging server computer, the first message request including data elements corresponding to message parameters specified by a user of a user device, the first message request configured to cause the messaging server computer to send the user device a first set of pending messages designated for the user and satisfying the message parameters, wherein building the message request comprises
obtaining the message parameters,
converting the message parameters into the data elements, and
embedding the data elements in the first message request;
sending, to the messaging server computer, the first message request having embedded therein the data elements corresponding to the message parameters, wherein the first message request having the data elements embedded therein enables the messaging server computer to identify and send back to the user device pending messages satisfying the user's message parameters;
receiving a first response message, including the pending messages satisfying the user's message parameters
retrieving a message sequence number from the first response message;
generating a second message request including the message sequence number;
sending, to the messaging server computer, the second message request, wherein the messaging server computer determines that the message sequence number matches a stored message sequence number; and
receiving a second response message, the second response message including a second set of pending messages.

8. The computer of claim 7, wherein the message parameters specify an order in which the messaging service is to send the pending messages.

9. The computer of claim 8, wherein the order specified by the message parameters is:
send the pending messages that are of an urgent priority level;
if all of the pending messages that are of the urgent priority level have been sent and if the maximum number has not been reached, send the pending messages that are of a high priority level; and
if all of the pending messages that are of the high priority level have been sent and if the maximum number has not been reached, send the pending messages that are of a regular priority level.

10. The computer of claim 7, further comprising:
detecting, by the computer, the occurrence of a trigger event to initiating the building of the first message request.

11. The computer of claim 7, wherein the message request further comprises:
embedding, by the computer, a message format version in the first message request.

12. The computer of claim 7, wherein the user device is a mobile phone comprising a mobile application for sending the first message request and receiving the first response message.

13. A computer comprising:
a processor; and
a non-transitory computer-readable storage medium, comprising code executable by the processor for implementing a method comprising:
receiving the message request from a user device, wherein the message request includes a first message sequence number:
determining that the first message sequence number matches a stored message sequence number, the stored message sequence number indicating a last response message sent to the user device;
determining message parameters that correspond to data elements embedded in the message request;
accessing pending messages data that includes a plurality of pending messages;
identifying in the pending messages data pending messages that are designated for a user associated with the user device and corresponding to the message parameters; and
sending the identified pending messages to the user device as response messages.

14. The computer of claim 13, wherein determining the message parameters that correspond to the data elements embedded in the message request further comprises:
accessing a table of data elements and corresponding message parameters; and
locating in the table of data elements, the message parameters corresponding to the data elements embedded in the message request.

15. The computer of claim 13 wherein the method further comprises:
for each pending message in the identified pending messages,
associating a message sequence number with the pending message, the message sequence number being subsequent to a most recently associated message sequence number, and
sending the message sequence number with the pending message.

16. The computer of claim 13, wherein each response message further comprises an identifier associated with a mobile application stored on the user device.

17. The computer of claim 13, wherein the user device is a mobile phone comprising a mobile application for sending the message request and receiving the message responses.

* * * * *